United States Patent
Soman et al.

(10) Patent No.: US 9,536,107 B2
(45) Date of Patent: Jan. 3, 2017

(54) SYSTEM AND METHOD ENABLING MULTIPARTY AND MULTI LEVEL AUTHORIZATIONS FOR ACCESSING CONFIDENTIAL INFORMATION

(71) Applicant: Tata Consultancy Services Limited, Mumbai (IN)

(72) Inventors: Anushka Soman, Bangalore (IN); Shalin Garg, Bangalore (IN); Sathish Vallat, Bangalore (IN); Sachin Kumar Agrawal, Bangalore (IN); Annie Thomas, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 62 days.

(21) Appl. No.: 14/720,168

(22) Filed: May 22, 2015

(65) Prior Publication Data

US 2016/0283737 A1    Sep. 29, 2016

(30) Foreign Application Priority Data

Mar. 24, 2015 (IN) ............................ 973/MUM/2015

(51) Int. Cl.
G06F 7/04 (2006.01)
G06F 21/62 (2013.01)
(Continued)

(52) U.S. Cl.
CPC ........... *G06F 21/6245* (2013.01); *G06Q 40/02* (2013.01); *H04L 63/0861* (2013.01); *H04L 63/105* (2013.01)

(58) Field of Classification Search
CPC .......................... G06F 21/6245; H04L 63/105
See application file for complete search history.

(56) References Cited

U.S. PATENT DOCUMENTS 7,921,299 B1 *  4/2011  Anantha ................ G06F 21/53
                                                             705/51
8,572,391 B2   10/2013  Golan et al.
(Continued)

FOREIGN PATENT DOCUMENTS

WO    2007002029 A2    4/2007

OTHER PUBLICATIONS

Sumita Sarkar and Abhishek Roy, "Survey on Biometric Applications For Implementation Of Authentication In Smart Governance", Researchers World—Journal of Arts, Science & Commerce, vol.-IV, Issue—Oct. 4, 2013 (12 pages).
(Continued)

*Primary Examiner* — Mohammad W Reza
*Assistant Examiner* — Khoi Le
(74) *Attorney, Agent, or Firm* — Shumaker, Loop & Kendrick, LLP (57) ABSTRACT

Disclosed is a method and system for enabling multi-party and multi level authorizations for accessing confidential information. A first set of access privilege levels, a first set of credentials, a second set of access privilege levels and a second set of credentials are configured corresponding to a plurality of services. A service consumer may be identified using an identifier and thereafter authorized to issue a request for a service based upon authentication of the service consumer using an access privilege level of the first set of access privilege levels and a credential of the first set of credentials. After the authentication, an OTAT is generated. A service provider may be authenticated using the OTAT, an access privilege level of the second set of access privilege levels and a credential of the second set of credentials. The service provider is then authorized to access the confidential information of the service consumer.

16 Claims, 5 Drawing Sheets

(51) Int. Cl.
*H04L 29/06* (2006.01)
*G06Q 40/02* (2012.01)

(56) References Cited

U.S. PATENT DOCUMENTS

| | | |
|---|---|---|
| 8,583,498 B2 | 11/2013 | Fried et al. |
| 9,147,061 B1* | 9/2015 | McClendon ............ G06F 21/32 |
| 2008/0114697 A1 | 5/2008 | Black et al. |
| 2008/0133408 A1 | 6/2008 | Nakfoor |
| 2008/0282334 A1 | 11/2008 | Yves et al. |
| 2012/0323717 A1* | 12/2012 | Kirsch ............... G06Q 20/0855 |
| | | 705/26.1 |

OTHER PUBLICATIONS

Shirley Radack, "Electronic Authentication: Guidance for Selecting Secure Techniques" Computer Security Division, Information Technology Laboratory, National Institute of Standards and Technology retrieved date May 6, 2015 (6 pages).
Federal Financial Institutions Examination Council "Authentication in an Electronic Banking Environment" Aug. 8, 2001 (14 pages).

\* cited by examiner

SYSTEM AND METHOD ENABLING MULTIPARTY AND MULTI LEVEL AUTHORIZATIONS FOR ACCESSING CONFIDENTIAL INFORMATION

CROSS-REFERENCE TO RELATED APPLICATIONS AND PRIORITY

The present application claims priority from an Indian patent application number 973/MUM/2015 filed on Mar. 24, 2015.

TECHNICAL FIELD

The present disclosure described herein generally relates to systems and methods for management of secure access to confidential information, and more specifically, to the security management of transactions performed for, or on behalf of, a customer.

BACKGROUND

Financial institutions such as banks hugely depend on Information Technology (IT) system for implementing various tasks in relation to fulfillment of the needs of the banks as-well-as the customers of the banks. The tasks may include processing service requests such as a business transaction, money transfer, ATM transaction, credit card transaction, and the like. In order to process the service requests, the banks may access customer's confidential information. However, since the confidential information is considered to be private, the confidential information should not be misused by any person other than the intended customer in the bank. Therefore, only authorized personnel providing assisted services to the bank customers may be enabled to view, amend or handle the confidential information in order to process the service requests at the time when the customer is being attended to and the customer has provided active consent and authorization to the bank personnel who is providing the assisted service Thus, security systems employed in the IT system prevents misuse of the confidential information and facilitates the safe transactions. Further, the multi-party and multi-level security systems prevent any unwarranted activity that could cause loss to the banks and the customers thereof.

In order to facilitate secure transactions, most of the security systems generally enable authorized personnel of the banks to access the customer's confidential information including personal information, customer's bank account details, customer profile and the like while processing the service requests. However, in such scenarios, it is observed that while the service requests of the customer is being processed by the authorized personnel, the customer, standing on other side of the service counter in the bank, is unable to view, access, monitor or control the activities performed by the authorized personnel. Further, it should be noted that the personal information being made fully disclosed to the authorized personnel may turn disastrous to the customer, in the event of misuse. Compromising the personal information such as bank account number, PIN, password, access to the customer profile and the like may cause loss to the customer as well as the bank itself. Further, the customer has no information on the activities of the authorized personnel on a customer account after rendering services to the customer. This may lead to situations wherein the authorized personnel may take advantage of the confidential information and perform unauthorized transactions on a customer's account utilizing the window of opportunity within the session expiry of the authenticated session after the customer's assisted service has been performed. This could go undetected even while audit actions are performed. Further, the customer is unaware about whether or not the session initiated has been destroyed after resolution of the service request. There is a need to provide strong controls to the system wherein customer has complete control over what services an authorized bank personnel has access to. The system could be implemented with security controls that prevent and detect employee embezzlement, while allowing active control by the customer while requesting for assisted services. Having multiple parties and multiple levels of authorizations to complete a transaction involving confidential information minimizes security breaches.

SUMMARY

This summary is provided to introduce aspects related to systems and methods for enabling multi-party and multi-level authorizations for accessing confidential information and the aspects are further described below in the detailed description. This summary is not intended to limit the scope of the claimed subject matter.

In one implementation, a method for enabling multi-party and multi-level authorizations for accessing confidential information is disclosed. The method may include configuring, by a processor, a plurality of services, a first set of access privilege levels, a first set of credentials corresponding to the first set of access privilege levels, a second set of access privilege levels and a second set of credentials corresponding to the second set of access privilege levels. The first set of access privilege levels and the second set of access privilege levels are associated with the plurality of services. In an aspect, at least one access privilege level of the first set of access privilege levels and at least one credential of the first set of credentials are provided to one or more service consumers (also referred hereinafter as one or more customers interchangeably) for requesting one or more services of the plurality of services. Further, at least one access privilege level of the second set of access privilege levels and at least one credential of the second set of credentials are provided to a service provider to serve the one or more services requested by the one or more service consumers. The method may further include identifying, by the processor, the one or more service consumers based upon a unique identifier associated with the one or more service consumers. The method may further include receiving, by the processor, a service request from the one more service consumers, after the identification, for facilitating one or more services of the plurality of services. Further, the method may include authenticating, by the processor, the one or more service consumers based upon an access privilege level, of the first set of access privilege levels, configured for the service and a credential, of the first set of credentials, corresponding to the access privilege level of the first set of access privilege levels. The method may further include generating, by the processor, a One Time Authorization Token (OTAT) corresponding to the one or more services requested by the one more service consumers after the authorization of the one or more service consumers. Further, the method may include authenticating, by the processor, the service provider based on the OTAT, an access privilege level, of the second set of access privilege levels, configured for the service and a credential, of the second set of credentials, corresponding to the access privilege level of the second set of access privilege levels. Furthermore, the method may include authorizing, by the processor, the service provider to access confidential information, associated with the one or more service consumers, required for serving the service request from the one or more service consumers. In an aspect, the access may be provided to the service provider until the service request is served or a validity time associated with the OTAT is expired.

In another implementation, a system for enabling multi-party and multi-level authorizations for accessing confidential information is disclosed. The system may include a processor and a memory coupled to the processor. The processor may execute a plurality of modules stored in the memory. The plurality of modules may include a service configuration module and a user interaction module. The service configuration module may configure a plurality of services, a first set of access privilege levels, a first set of credentials corresponding to the first set of access privilege levels, a second set of access privilege levels and a second set of credentials corresponding to the second set of access privilege levels. The first set of access privilege levels and the second set of privilege levels are associated with the plurality of services. In an aspect, at least one access privilege level of the first set of access privilege levels and at least one credential of the first set of credentials are provided to one or more service consumers for requesting one or more services of the plurality of services. Further, at least one access privilege level of the second set of access privilege levels and at least one credential of the second set of credentials are provided to a service provider to serve the one or more services requested by the one or more service consumers. The user interaction module may identify the one or more service consumers based upon a unique identifier associated with the one or more service consumers. The user interaction module may further receive a service request from the one more service consumers, after the identification, for facilitating one or more services of the plurality of services. Further, the user interaction module may authenticate the one or more service consumers based upon an access privilege level, of the first set of access privilege levels, configured for the service and a credential, of the first set of credentials, corresponding to the access privilege level of the first set of access privilege levels. The user interaction module may further generate a One Time Authorization Token (OTAT) corresponding to the one or more services requested by the one or more service consumers after the authentication of the one or more service consumers. Further, the user interaction module may authenticate the service provider based on the OTAT and an access privilege level, of the second set of access privilege levels, configured for the service and a credential, of the second set of credentials, corresponding to the access privilege level of the second set of access privilege levels. Furthermore, the user interaction module may authorize the service provider to access confidential information, associated with the one or more service consumers, required for serving the service request from the one or more service consumers. In an aspect, the access may be provided to the service provider until the service request is served or a validity time associated with the OTAT is expired.

In yet another implementation, a non-transitory computer readable medium embodying a program executable in a computing device for enabling multi-party and multi-level authorizations for accessing confidential information is disclosed. The program may include a program code for configuring a plurality of services, a first set of access privilege levels, a first set of credentials corresponding to the first set of access privilege levels, a second set of access privilege levels and a second set of credentials corresponding to the second set of access privilege levels. The first set of access privilege levels and the second set of access privilege levels are associated with the plurality of services. In an aspect, at least one access privilege level of the first set of access privilege levels and at least one credential of the first set of credentials are provided to one or more service consumers for requesting one or more services of the plurality of services. Further, at least one access privilege level of the second set of access privilege levels and at least one credential of the second set of credentials are provided to a service provider to serve the one or more services requested by the one or more service consumers. The program may further include a program code for identifying the one or more service consumers based upon a unique identifier associated with the one or more service consumers. The program may further include a program code for receiving a service request from the one more service consumers, after the identification, for facilitating one or more services of the plurality of services. Further, the program may include a program code for authenticating the one or more service consumers based upon an access privilege level, of the first set of access privilege levels, configured for the service and a credential, of the first set of credentials, corresponding to the access privilege level of the first set of access privilege levels. The program may further include a program code for generating a One Time Authorization Token (OTAT) corresponding to the one or more services requested by the one more service consumers after the authentication of the one or more service consumers. Further, the program may include a program code for authenticating the service provider based on the OTAT, an access privilege level, of the second set of access privilege levels, configured for the service and a credential, of the second set of credentials, corresponding to the access privilege level of the second set of access privilege levels. Furthermore, the program may include a program code for authorizing the service provider to access confidential information, associated with the one or more service consumers, required for serving the service request from the one or more service consumers. In an aspect, the access may be provided to the service provider until the service request is served or a validity time associated with the OTAT is expired.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System(s) and method(s) for enabling multi-party and multi-level authorizations for accessing confidential information are described herein. In order to enable the multi-party and multi-level authorizations, the system(s) and method(s) may configure a plurality of services, a first set of access privilege levels, a first set of credentials corresponding to the first set of access privilege levels, a second set of access privilege levels and a second set of credentials corresponding to the second set of access privilege levels. The plurality of services may be related to banking domain and includes, but not limited to, updating account details, cash deposit, cheque clearance, cash withdrawal, and the like. Corresponding to each of the plurality of services, the first set of access privilege levels, the first set of credentials, the second set of access privilege levels and the second set of credentials may be configured.

Based upon the configuration, the first set of access privilege levels and the first set of credentials are provided to one or more service consumers for requesting one or more services of the plurality of services. The one or more service consumers may include one or more individuals, a business or a corporate entity, a Power of Attorney (POA) holder, a minor, or a guardian, joint account holders, and the like. Similarly, the second set of access privilege levels is provided to a service provider to serve the one or more services requested by the one or more service consumers. The first set of credentials and the second set of credentials may comprise at least one of a credential (such as username or password), personal account number (PAN), personal identification number (PIN), a biometric signature, a secret question, a credential used to access a social media platform, card login etc., and a combination thereof. In one example, the biometric signature comprises at one of a fingerprint, iris, face, palm-vein, voice and a combination thereof. The first set of access privilege levels and the second set of access privilege levels may be configured based on each service using one or more combinations of the first set of credentials and the second set of credentials respectively along with a level of confidentiality associated with the confidential information. The one or more service consumers may be registered parties at the bank and have enrolled for one or more credentials required for accessing one or more services from a plurality of services.

In order to consume at least one service from the plurality of services being configured, the one or more consumers may initially be identified by the system. The one or more service consumers may be identified based upon a unique identifier associated with the one or more service consumers. The unique identifier may include, but not limited to, one of a login credential (like username and password), Radio-frequency identification (RFID), a personal account number (PAN), a personal identification number (PIN), and the like. Further, the one or more consumers being identified using the unique identifier may be an individual account holder, or an account holder on behalf of several joint account holders, or a power of Attorney (POA) on behalf of an individual or joint account holders, or a person authorized on behalf of a corporate or business entity, or a guardian on behalf of a minor account holder.

After the identification of the one or more consumers, a service catalogue comprising a one or more services, from the plurality of services applicable for the one or more service consumers may be displayed on a service consumer device of the one or more consumers. In one example, the service consumer device is one of a mobile phone, a kiosk, an interactive voice response (IVR) enabled device, internet enabled device, and a computing terminal present within the premises of the service provider. The one or more consumers may issue a service request for consuming a service from one or more services displayed on the service consumer device. The service consumer device may be pre-registered to issue the service request. In one embodiment, if the service consumer device is one of the mobile phone, the kiosk, the interactive voice response (IVR) enabled device, and the internet enabled device, the one or more consumers may issue the service request from a location remote to the premises of the service provider. Alternatively, the service request may be issued from the computing terminal present within the premises of the service provider. The service request may be issued for facilitating one or multiple services at a single instance.

After the issuance of the service request using the computing terminal present within the premises of the service provider, the one or more service consumers may be authenticated based upon an access privilege level, of the first set of access privilege levels, configured for the service requested and a credential, of the first set of credentials, corresponding to the access privilege level of the first set of access privilege levels. In one embodiment, if the service request is issued for a single service the one or more consumers may be authenticated based upon the access privilege level and the credential corresponding to the access privilege level configured for the single service. Alternatively, in another embodiment, if the service request is issued for multiple services, the one or more consumers may be authenticated based on highest access privilege level amongst the access privilege levels configured for the multiple services and a credential corresponding to the highest access privilege level. The authentication based on the credential, of highest access privilege level enables the one or more consumers to consume the multiple services.

Based upon the authentication, a One Time Authorization Token (OTAT) corresponding to the one or more services requested by the one more service consumers may be generated. The OTAT may comprise token details including, but not limited to, a token type, Unique ID for Token, Host Identifier, role and access privilege level of service provider for whom the token is issued, identifier of a service consumer who issues the token, consumer ID, list of accounts along with account identifiers, service end point references, list of services for the accounts, access privilege level for each service, data sensitivity instructions, token issue timestamp, and token expiry timestamp.

In an embodiment, if the service request is issued, from a remote location, using one of the mobile phone, the kiosk, the interactive voice response (IVR) enabled device, and the internet enabled device, the one or more consumers may be authenticated, via the service consumer device, and a unique key based upon the authentication may be generated. The unique key may be one of an alphanumeric key, a numeric key, or a hash code or combinations thereof. The generation of unique key may be further notified to the one or more service consumers by transmitting a text message or a multimedia message on the service consumer device registered with the bank. The unique key may further be associated to metadata including, but not limited to, access privilege level associated with a role for fulfilling the service authorization details, service details, information of the one or more service consumers, a validity time and a wait time. Using the metadata, the key may be further translated to an OTAT.

After the generation of the OTAT, the service provider may be authenticated based on the OTAT and an access privilege level, of the second set of access privilege levels, configured for the service or the multiple services and a credential, of the second set credentials, corresponding to the access privilege level of the second set of access privilege levels. Further, the service provider may be authorized to access confidential information, associated with the one or more service consumers, required for serving the service request from the one or more service consumers. Further, the service provider may be authorized to access the confidential information via an authorized service provider device. The service provider device may be a computing terminal present within the premises of the service provider. Further, the service provider device may be pre-registered to serve the service request from the one or more service consumers.

In an aspect, the service provider may access the confidential information using the service provider device until the service request is served or the validity time associated with the OTAT is expired. The confidential information is classified into at least one of predefined categories based upon the level of confidentiality associated with the confidential information, and wherein the confidential information is displayed, on the service provider device, based upon the classification of the confidential information into a predefined category. In one embodiment, the predefined category is one of "highly secret", "secret", "confidential" and "restrictive". Further, the confidential information may be masked or partially masked based upon the classification of the confidential information into the predefined category. In one example, if the confidential information is categorized into the "highly secret" category, the confidential information will be masked and hence is not displayed on the service provider device. In another example, if the confidential information is categorized into the "restrictive" category, the confidential information will be partially masked and hence partially displayed on the service provider device.

In an embodiment, the confidential information may also be segregated into different confidentiality levels like Level 1, Level 2, Level 3 and Level 4. In this embodiment, the confidential information segregated as Level 1, Level 2, Level 3 and Level 4 may include public information, private information, private sensitive information and secret information respectively. In one example, the private sensitive information may be Personal and financial data including, but not limited to, Social Security number (SSN), Credit card number or banking information, Passport number, Foreign visa number, Tax information, Credit reports, any other data that may be used to facilitate identity (e.g., mother's maiden name), Federally protected data, State protected data, and the like. The Federally protected data may include FERPA-protected information (e.g., student information and grades), HIPAA-protected information (e.g., health, medical, or psychological information). Further, the State protected data is personal information of an individual recognized as sensitive by the state and includes, but not limited to, first name and last name, first initial and last name, a Social Security number, driver's license number or identification card number, account number, credit card number, debit card number, security code, access code, or password of an individual's financial account, University restricted or critical data, Human subjects research data, passwords, and the like.

In one embodiment, after the consumption of the services marked in the OTAT, the one or more consumers may be enabled to issue another service request for consuming one or more additional service from the service catalogue. The service provider may be authorized to serve the other service request, provided the other service request is received within the validity time associated with the OTAT generated for the service or the multiple services requested earlier as described above. In order to serve the other service request, the service provider may be authenticated based on the OTAT, an access privilege level, of the second set of access privilege levels, configured for enabling display of the service catalogue to the one or more service consumers and a credential corresponding to said access privilege level, of the second set of access privilege levels, configured for enabling the display of the service catalogue. Based upon the authentication, the service catalogue may be displayed on the service consumer device. Further, the other service requests for facilitating the one or more additional service, present in the service catalogue, may be received from the one or more service consumers. After the receipt of the another service request, the one or more service consumers may be authenticated based on an additional access privilege level of the first set of access privilege levels configured for the one or more additional service and a credential corresponding to the additional access privilege level of the first set of access privilege levels configured for the one or more additional service. After the authentication of the one or more consumers, the token details in the OTAT may be updated, based upon service details of the additional one or more service, in order to generate an updated OTAT. Thereafter, the service provider may be authorized to access confidential information based upon the updated OTAT in order to serve the service request associated with one or more additional service.

It is to be noted that once the service provider is authenticated using the OTAT a session may be activated for facilitating the service. The service provider may use the session activated in order to access the information based upon the configuration. Further, the service provider may be enabled to input data corresponding to the service consumer's account. Further, it must be understood that if while accessing the information and facilitating the service, the service provider observes any discrepancies/errors in the information displayed, the service provider may be enabled to destroy/delete the session being activated corresponding to that service. While aspects of the described system for enabling multi-party and multi-level authorizations for accessing confidential information may be implemented in any number of different computing systems, environments, and/or configurations, the embodiments are described in the context of the following exemplary system.

Figure 1:
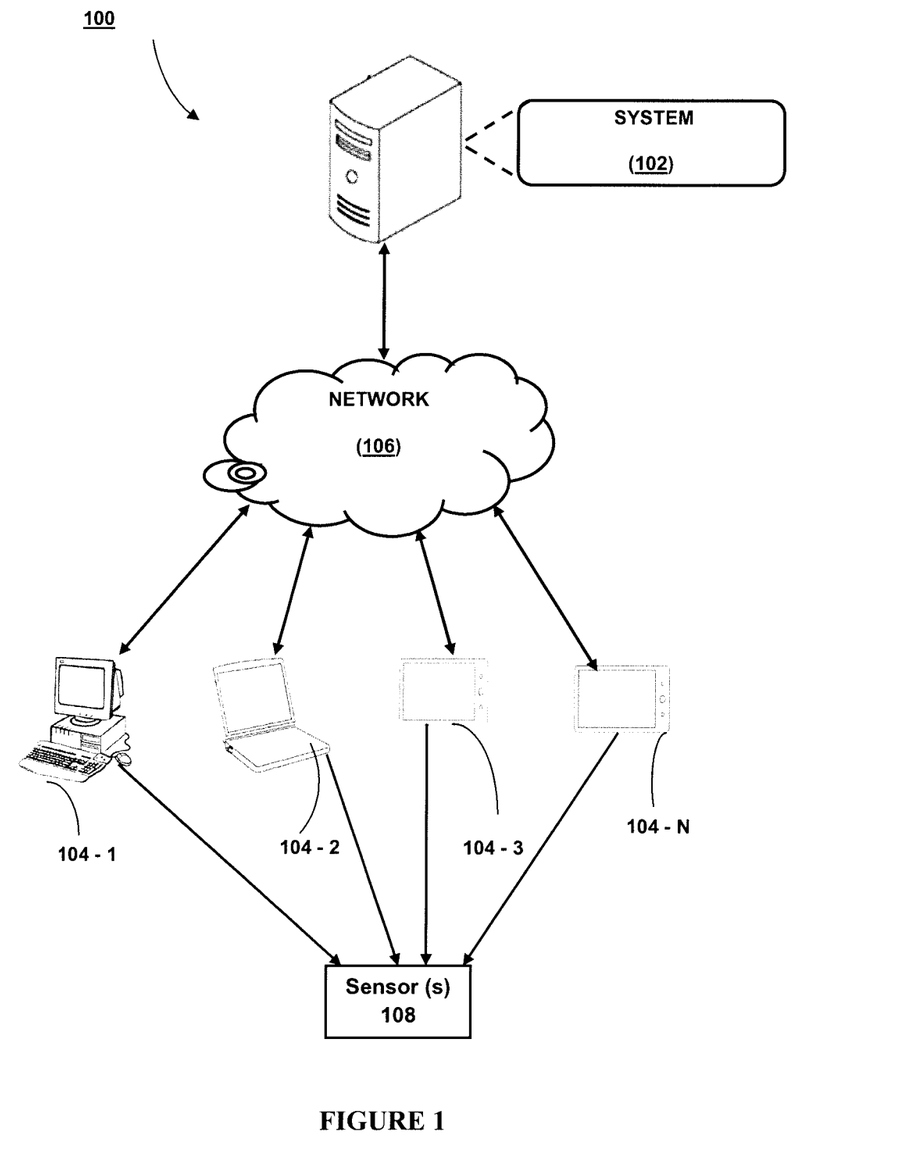
FIG. 1 illustrates a network implementation of a system for enabling multi-party and multi-level authorizations for accessing confidential information, in accordance with an embodiment of the present disclosure.

Referring now to FIG. 1, a network implementation 100 of a system 102 for enabling multi-party and multi-level authorizations for accessing confidential information is illustrated, in accordance with an embodiment of the present disclosure. Although the present disclosure is explained considering that the system 102 is implemented on a server, it may be understood that the system 102 may be implemented as variety of computing systems, such as a laptop computer, a desktop computer, a notebook, a workstation, a mainframe computer, a network server, and the like. It will be understood that the system 102 may be accessed by multiple users (such as one or more service consumers and one or more service providers) through one or more user devices 104-1, 104-2, 104-3, and 104-N, collectively referred to as user 104 hereinafter, or applications residing on the user devices 104. Further, the user devices 104 may act as consumer devices or service provider devices depending upon whether the system 102 is being accessed by the one or more consumers or the one or more service providers. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. The system 102 may further be communicatively coupled with the sensor(s) 108 associated with the user devices 104 as shown in FIG. 1. The sensor(s) 108 may include Smart Card Reader (RFID/NFC), Fingerprint Biometric sensor, Palm-vein Biometric sensor, Iris scanner, face recognition sensor, microphone, and the like.

Figure 2:
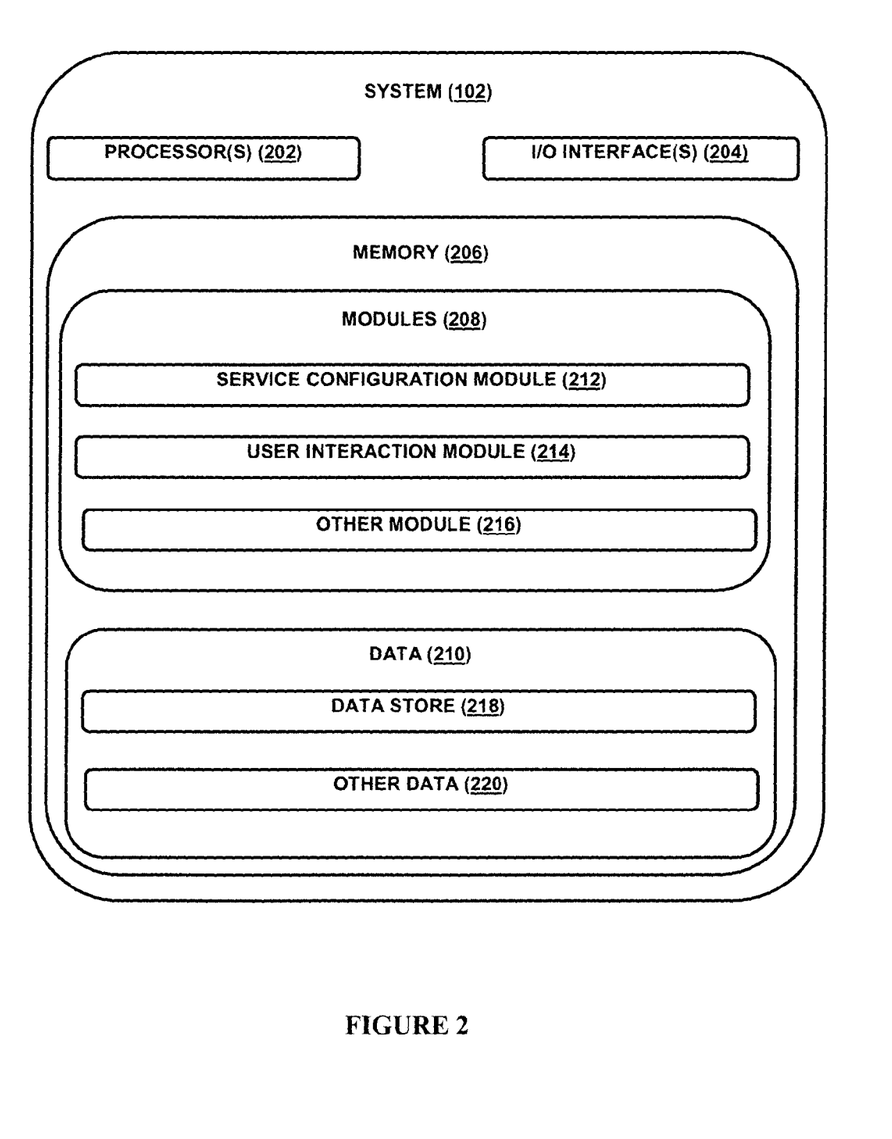
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. In an embodiment, the interface 204 may further comprise extended interfaces (interface 1 and interface 2) for facilitating the users to access the system 102 simultaneously. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a service configuration module 212, a user interaction module 214 and other module 216. The other module 216 may include programs or coded instructions that supplement applications and functions of the system 102.

The data 210, amongst other things, serves as a repository for storing data processed, received, and generated by one or more of the modules 208. The data 210 may also include a data store 218 and other data 220. In one embodiment, the data store 218 may store user data including user personal information like name, gender, address along with account number, passwords, biometric data, personal identification number (PIN), credit/debit card details, balance amount, nominee details, login credentials, transaction history and other associated data. The other data 220 may include data generated as a result of the execution of one or more modules in the other module 216.

In one implementation, at first, a user may use the user device or the I/O interface 204 to access the system 102. The user may register themselves using the I/O interface 204 in order to use the system 102. The working of the system 102 using the plurality of modules 208 along with other components is explained in detail referring to architecture of the system 102 through FIG. 3 as explained below.

Figure 3:
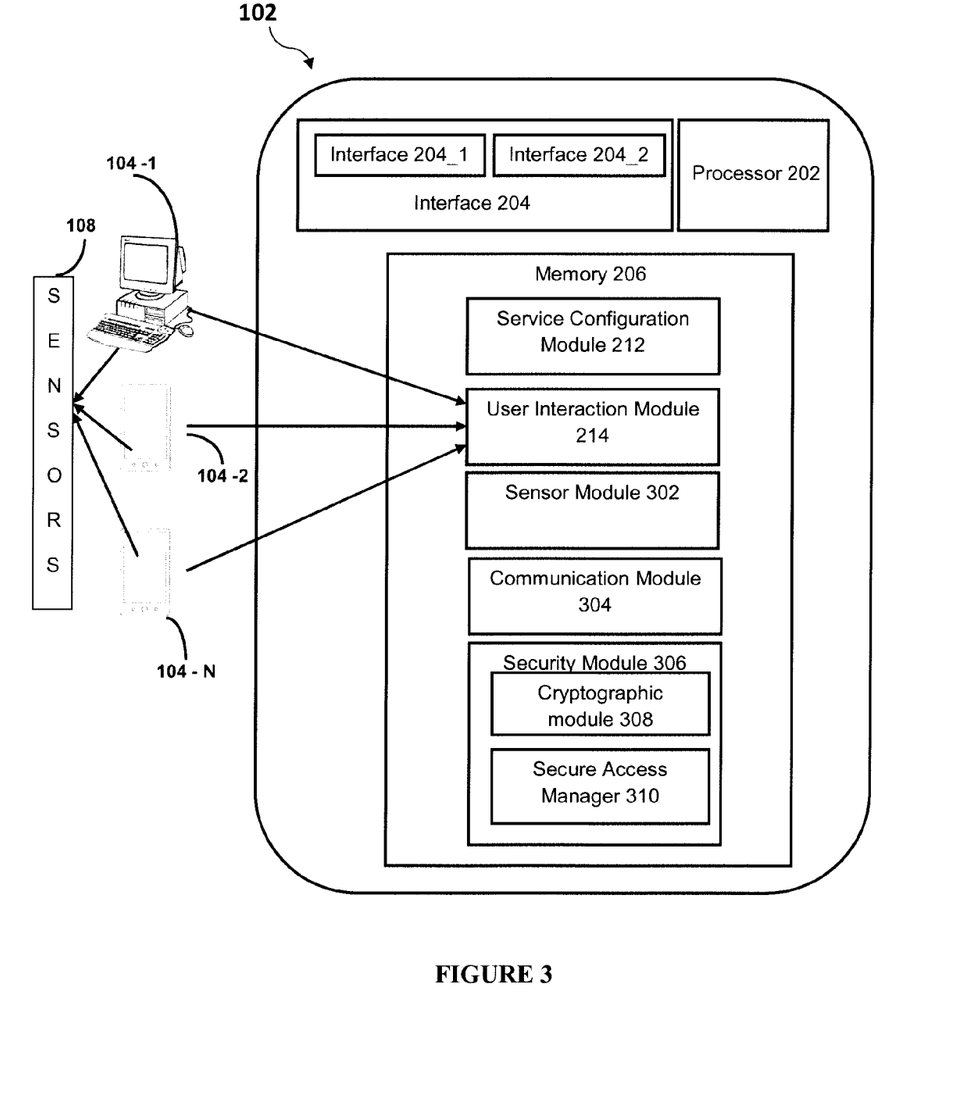
FIG. 3 illustrates components of the system, in accordance with an embodiment of the present disclosure.

Referring now to FIG. 3, components 300 of the system 102 is described. The system 102 may comprise hardware components like the interface 204, the processor 202, and the memory 206. The memory 206 may comprise modules 208. The modules 208 include the service configuration module 212, the user interaction module 214, a sensor module 302, a communication module 304 and a security module 306. The security module 306 may further include cryptographic module 308 and secure access manager 310. Further, as shown in FIG. 3, the system 102 may be accessed by one or more service consumers and one or more service providers through the user devices 104-1, 104-2, 104-3, and 104-N. The user devices 104 may be a service consumer device or a service provider device in accordance with an embodiment of the present disclosure. Further, as shown in FIG. 3, the user devices 104 may be connected with the sensors 108.

Referring to FIG. 3, the service configuration module 212 may configure a plurality of services, a first set of credentials corresponding to the first set of access privilege levels, a second set of access privilege levels and a second set of credentials corresponding to the second set of access privilege levels. The first set of access privilege levels and the second set of access privilege levels are associated with the plurality of services. In one embodiment, at least one access privilege level of the first set of access privilege levels and at least one credential of the first set of credentials are provided to the one or more service consumers for requesting one or more services of the plurality of services. Further, at least one access privilege level of the second set of access privilege levels and at least one credential of the second set of credentials are provided to a service provider to serve the one or more services requested by the one or more service consumers.

The service configuration module 212 may further analyze sensitivity of the confidential information stored in the data store 218 in order to classify the confidential information into at least one of predefined categories based upon the level of confidentiality associated with the confidential information, and wherein the confidential information is displayed, on the service provider device, based upon the classification of the confidential information into a predefined category. In one aspect, the predefined category may comprise highly secret, secret, confidential and restrictive, and wherein the confidential information is masked or partially masked based upon the classification.

In an embodiment, the service configuration module 212 may configure the plurality of access privilege levels based on the sensitivity as well as the classification of the confidential information. The process of classification of the data pertaining to any business establishment may be classified into a plurality of levels. The levels are basically security features which are assigned to each category of information or data which is secure in nature. Based on the increase in the nature of security of the data, the level of authorization may increase. The confidential information is classified into at least one of predefined categories based upon the level of confidentiality associated with the confidential information, and wherein the confidential information is displayed, on the service provider device, based upon the classification of the confidential information into a predefined category. In one embodiment, the predefined category is one of "highly secret", "secret", "confidential" and "restrictive". Further, the confidential information may be masked or partially masked based upon the classification of the confidential information into the predefined category. In one example, if the confidential information is categorized into the "highly secret" category, the confidential information will be masked and hence is not displayed on the service provider device. In another example, if the confidential information is categorized into the "restrictive" category, the confidential information will be partially masked and hence partially displayed on the service provider device.

In an embodiment, the confidential information may also be segregated into different confidentiality levels like Level 1, Level 2, Level 3 and Level 4. In this embodiment, the confidential information segregated as Level 1, Level 2, Level 3 and Level 4 may include public information, private information, private sensitive information and secret information respectively. In one example, the private sensitive information may be Personal and financial data including, but not limited to, Social Security number (SSN), Credit card number or banking information, Passport number, Foreign visa number, Tax information, Credit reports, Commercial customers' data, financials, Merger/Acquisition info, Non-published financial information, Wire Transfer Transactions, Patents, trademarks, or trade secrets, Cardholder data such as Primary Account Number (PAN), Customer name with address, phone # and/or email address, Non Released Marketing Material, Consumer income, PINs/PIN blocks, CAV2/CVC2/CVV2/CID, Full track data (magnetic-stripe data or equivalent on a chip) or any other data that may be used to facilitate identity (e.g., mother's maiden name), Federally protected data, State protected data, and the like. The Federally protected data may include FERPA-protected information (e.g., student information and grades), HIPAA-protected information (e.g., health, medical, or psychological information). Further, the State protected data is personal information of an individual recognized as sensitive by the state and includes, but not limited to, first name and last name, first initial and last name, a Social Security number, driver's license number or identification card number, account number, credit card number, debit card number, security code, access code, or password of an individual's financial account, University restricted or critical data, Human subjects research data, passwords, and the like.

In an exemplary embodiment, consider a scenario of securing confidential information of a bank customer from being accessed by a bank executive of a bank while facilitating banking services to the bank customer. In this scenario, the service configuration module 212 may classify confidential information associated with the bank customer of the bank having account in the bank. The service configuration module 212 may be enabled to classify the confidential information associated with the consumer. The classification may be performed whenever required by the bank or at the request of the customer based on the sensitivity of the data. The service configuration module 212, upon successful classification, may assign the access privilege level to each plurality of banking services based on the nature of the banking service and sensitivity of the information associated with the service. The classification of data and the assigning the access privilege level may further be explained in detail in by considering following exemplary embodiment.

According to the exemplary embodiment, one of the banking services such as transfer of money/funds from the bank account of the customer to any other bank account is considered. The system 102 may be enabled, through the service configuration module 212, to classify the confidential information of the customer such as password, PIN, credit limit, one or more biometric data of the customer based on the sensitivity of the confidential information into various sensitivity levels such as low, medium and highly sensitive data. Furthermore, upon classification, one or more data fields may be masked based on usefulness of the data for rendering of services and further based on the sensitivity of the data. In an embodiment, the masking of the sensitive data may be applied for the interface associated with the bank executive. At the same time, the customer may be enabled to view/access all the data without data being masked and irrespective of kind of service requested by the customer.

Further according to the exemplary embodiment, the service configuration module 212 may assign access privilege levels based on the sensitivity of the data and the nature of the service. According to the exemplary embodiment, for "transfer of money" service, the service configuration module 212 may classify "transfer of money" service into various levels such transfer up to INR 10,000/–, INR 10,001/– to INR 1 lac, and INR 1 lacs and above. Based on levels, the service configuration module 212 may assign the access privilege level to each class. In another embodiment, the service configuration may be performed by either the customer or the bank whenever required. In next step, the system 102 may be enabled to receive service request from the service consumer. The service request may be received from service consumer device 104 associated with the one or more service consumers.

The service consumer device 104 is one of a mobile phone, a kiosk, an interactive voice response (IVR) enabled device, internet enabled device, and a computing terminal present within the premises of the service provider. The one or more consumers may issue a service request for consuming a service from one or more services displayed on the service consumer device 104. The service consumer device 104 may be pre-registered with the system 102 in order to issue the service request. Furthermore, the system 102 may be configured to process the service request through the user interaction module 214. Processing of the service request using the system 102 may be explained in detail in the following description.

Before issuance of the service request, the one or more consumers may initially be identified by the system 102. The one or more service consumers may be identified based upon a unique identifier associated with the one or more service consumers. The unique identifier may include, but not limited to, one of a login credential (like username and password), Radio-frequency identification (RFID), a personal account number (PAN), a personal identification number (PIN), and the like. Further, the one or more consumers being identified using the unique identifier may be an individual account holder, or an account holder on behalf of several joint account holders, or a Power of Attorney (POA) on behalf of an individual or joint account holders, or a person authorized on behalf of a corporate or business entity, or a guardian on behalf of a minor account holder.

After the identification of the one or more service consumers, the system 102 may be enabled to receive the service request (hereinafter referred to as the "request") from the one or more consumers through the user interaction module 214 as shown in the FIG. 3. In one embodiment, if the consumer device is one of the mobile phone, the kiosk, the interactive voice response (IVR) enabled device, and the internet enabled device, the one or more consumers may issue the service request from a location remote to the premises of the service provider. Alternatively, the service request may be issued from the computing terminal present within the premises of the service provider. The service request may be issued for facilitating one or multiple services at a single instance. After the issuance of the service request using the computing terminal present within the premises of the service provider, the one or more service consumers may be authenticated based upon an access privilege level, of the first set of access privilege levels, configured for the service and a credential corresponding to the said access privilege level. In one embodiment, if the service request is issued for a single service, the one or more consumers may be authenticated based upon an access privilege level and a credential configured corresponding to the single service. Alternatively, in another embodiment, if the service request is issued for multiple services, the one or more consumers may be authenticated based on the highest access privilege level amongst the access privilege levels configured for the multiple services and the credential corresponding to the highest access privilege level. The authentication based on the highest access privilege level enables the one or more consumers to consume the multiple services.

Referring FIG. 3, the security module 306 may further comprise the secure access manager 310 which is based on service oriented architecture (SoA) or business layer components with domain model serving as contract for communication between client application and middleware. The secure access manager 310 may further comprise of security access set of instructions working based on request-response model. The secure access manager 310 may identify type of the request and determines the level of authentication required to serve the request. If the authentication level is not adequate to serve the request, then the secure access manager 310 responds back to the user interaction module 214 for providing the additional authentication. The user interaction module 214 may then prompt through the interface 204_1, associated with the service consumer, for an additional authentication and may request for additional credentials, for authentication, from the service consumer. Once the authentication level is approved, the secure access manager 310 may communicate with the system 102 to retrieve the information or data and may respond back to the user interaction module 214. The service consumer may be enabled to send request for authentication to the system 102 through the secure access manager 310. The secure access manager 310 may be configured to communicate with the system 102 and the data store 218 for authentication of the service consumer based on the at least one credential stored in the data store 218. Upon receiving the request from the service consumer for, authentication, the secure access manager 310 may verify at least one credential of the service consumer. Further, the secure access manager 310 may respond positively if the at least one credential (like voice, fingerprint and palm vein of the service consumer) is matched and subsequently the service consumer may be allowed to access the system 102 through the interface 1. In next step, the service consumer may place the request of the service through the user interaction module 214. Based on level of sensitivity and the successful authentication of the service consumer, the secure access manager 310 may be enabled to generate Unique ID associated with the request and the sensitivity of the confidential information requested through the request of the service. The secure access manager 310 may send this Unique ID to both the service consumer and the system 102. The service consumer may access the sensitive data by verifying the unique ID to the system 102. It may be noted that the Unique ID is sent over secure channel and may additionally be encrypted by the cryptographic module 308 using cryptographic means known in the art.

In an embodiment, upon successful authentication and verification of the Unique ID by the service consumer, the service consumer using the system 102 may be enabled to facilitate the service provider to access the data associated system 102 to render the services requested by the service consumer. Hence, using the system 102, the service consumer may provide access privilege levels to the service provider. Various steps to provide the access privilege levels i.e. secure access to the service provider are explained in the following description.

In one aspect, as shown in the FIG. 3, the communication module 304 may be adapted to facilitate communication between the plurality of users and the system 102. The communication may be either wired or wireless and may be facilitated through the network 106. Further, the user interaction module 214, via the security module 306, may be enabled to generate a One Time Authorization Token (OTAT) corresponding to the one or more services requested by the one more service consumers may be generated. The OTAT may comprise token details including, but not limited to, a token type, Unique ID for Token, Host Identifier, role and access privilege levels required for the service provider to whom the token is issued to provide the one or more services, name of a service consumer who issues the token, consumer ID, list of accounts along with account identifiers, server environment, list of services for the accounts, access privilege level for each service, data sensitivity instructions, token issue timestamp, and token expiry timestamp.

In an embodiment, if the service request is issued, from a remote location, using one of the mobile phone, the kiosk, the interactive voice response (IVR) enabled device, and the internet enabled device, the one or more consumers may be authenticated, via the consumer device, and a unique key based upon the authentication may be generated. The unique key may be one of an alphanumeric key, a numeric key, or a hash code. The generation of unique key may be further notified to the one or more service consumers by transmitting a text message or a multimedia message on the service consumer device. The unique key may further comprise metadata including, but not limited to, an authorization flag, service details, information of the one or more service consumers, a validity time and a wait time. Using the metadata, the key may be further translated to an OTAT.

After the generation of the OTAT, the service provider may be authenticated based on the OTAT, an access privilege level of the second set of access privilege levels configured for the service or the multiple services and a credential corresponding to the access privilege level of the second set of access privilege levels. Further, the service provider may be authorized to access confidential information, associated with the one or more service consumers, required for serving the service request from the one or more service consumers. The service provider may be authorized to access the confidential information via a service provider device. The service provider device may be a computing terminal present within the premises of the service provider. Further, the service provider device may be pre-registered to serve the service request from the one or more service consumers. In an aspect, the service provider may access the confidential information, via the interface 204_2, using the service provider device until the service request is served or the validity time associated with the OTAT is expired. Further, the security module 306 may also be enabled to generate the unique ID associated with the request placed by the service consumer in addition to the OTAT. Also, some of the data fields displayed via the interface 204_2 may be masked based on the sensitivity of the data. It is to be noted that the approach of facilitating two separate interfaces maintains transparency of the system 102 and thus enhances user satisfaction and security while rendering services associated with the requests.

In an embodiment, both the service consumer and the service provider may be authenticated based on a credential and an access privilege levels using biometric authentication techniques facilitated through various sensors 108 connected with the service consumer device and the service provider device. In one example, the sensor(s) 108 may include Iris scanner, face recognition sensor, microphone, Fingerprint Biometric sensor, Biometric sensor, Smart Card Reader (RFID/NFC), Palm-vein biometric sensor. The biometric template captured by these sensor(s) may be further processed and verified by the sensor module 302 of the system 102 to match with the stored template in the data store 218 and thereby authenticate the service consumer or the service provider, as the case may be. In one embodiment, the sensor module 302 comprises one or more sensor libraries configured to match the stored template (also referred as a golden copy template) with the biometric template captured by each of the sensor(s) 108 in order to authenticate the service consumer or the service provider. An implementation of the system 102 in a banking scenario is further explained in detail using an exemplary embodiment as illustrated in FIG. 4.

Figure 4:
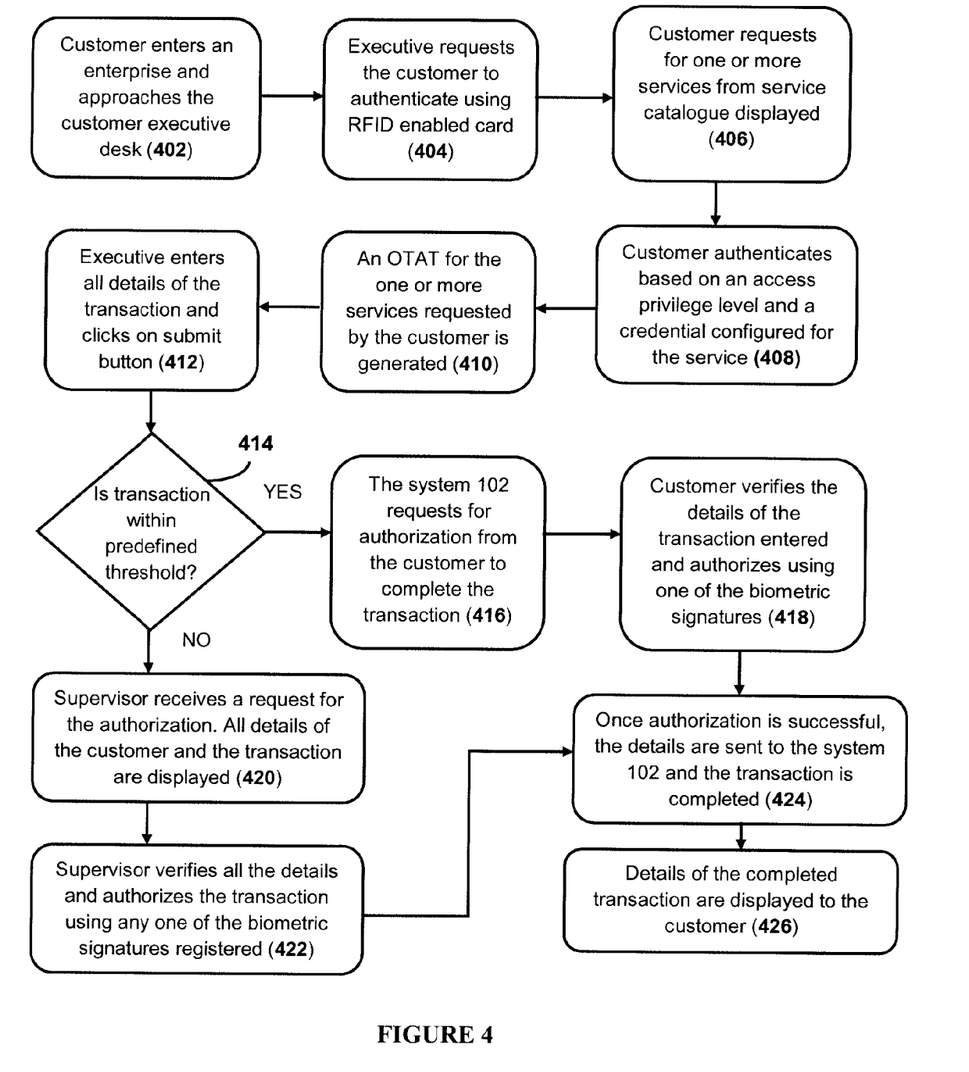
FIG. 4 illustrates an implementation of the system in a banking domain, in accordance with an embodiment of the present disclosure.

The FIG. 4 illustrates the exemplary embodiment considering a scenario wherein a financial establishment such as a bank with multiple parties to authorize a transaction. In this embodiment, at front desk area of the bank, consider an executive, or the service provider, requires access to view the data associated with a customer i.e. the service consumer. Flowchart in the FIG. 4 illustrates the steps for providing multilevel access privilege in the following description.

At block 402, the customer enters the enterprise and approaches the Customer Executive Desk. Further, at block 404, the executive requests the customer to identify using at least one login credential i.e. RFID enabled card. At block 406, the customer may request for a service request for facilitating one or more services from a plurality of services displayed on the interface through the system 102. The service request may be particular transaction or modification to be done on his/her account. At block 408, the system 102 prompts the customer to authenticate using at least one of the credentials configured for the service request corresponding to the access privilege level required for the service. Furthermore, at block 410, based upon the authentication of the customer, an OTAT corresponding to the one or more services requested through the service request is generated. At block 412, the executive, using the OTAT, enters all the details of the transaction and clicks on the 'submit' of the interface of the system 102 associated with the executive. Upon submitting, at block 414, it is checked whether the transaction to be conducted is within a predefined threshold. In one scenario, where the transaction is within the predefined threshold, then, at block 416, the system 102 requests for authorization from the customer to complete the transaction. In next step, at block 418, the customer verifies the details entered and authorizes the same using one of the biometric signature associated with the customer. Upon successful authorization, at block 424, the details are sent to the system 102 and the transaction is completed. However, in another scenario, at block 414, if the transaction to be conducted is not within the predefined threshold, then, at block 420, the supervisor of the executive receives all the details of the customer and the transaction entered. Upon verifying the details, at block 422, the supervisor authorizes the transaction using one of the biometric signatures registered. Once the supervisor authorization is successful, the details are sent to the system 102 and the transaction is completed at bock 424. At block 426, details of the completed transaction are displayed to the customer.

Furthermore, in the exemplary embodiment, assume that a request from the executive to access the data of the customer is considered to be level 1 secure request from a set of plurality secure access levels. The customer would then be prompted by the system 102 to provide his/her at least one factors which may be a card (the cards may also be Debit/Credit/Loyalty/Access/smart cards/ATM Card issued by the bank) and credentials, wherein the credentials may be on level one, say, a fingerprint, to allow the access to the system 102 and perform the request of the service. If the customer wants to make a change to his/her data stored in the data store 218, the executive would initiate the request which would be treated as a level 2 secure request and would require another credential such as biometric signature of the customer, say, a iris scan to complete the request. Furthermore, certain transactions/processes would require a supervisors' authorization and the system 102 may consider this as a level 3 secure request and therefore the supervisor would be required to provide his/her biometric signature in order to render the service to the customer.

Additionally, the access may prove to be efficient and secured which allows the users to control access to his/her profile completely. Hence, the identification and authorization process based on such a secure multi-level system may make all the business transactions more secured and also reduce the time consumed for completing any transaction. Use of multi-factor authentication to access any users' account, initiate and complete any business transaction ensures more security. The use of Biometric signatures from multi-party as multi factor authentication reduces the chances of forgery and/or fraud.

Furthermore, in another embodiment, in case of a "self-service channel" such as mobile, phone banking, Kiosk or Internet, the service consumer may be enabled to assign authorization levels for different services for availing for own use. The self service channel may be used for differential transaction limits, different geographies, and different type of accounts such as Foreign Currency, Joint Accounts, in the embodiment of the bank scenario. Additionally, the authorization levels set by the service consumer may be extended to "Omni-channel" scenarios wherein one channel may be used for initiation of the service and another channel may be used to resume the initiated service.

Figure 5:
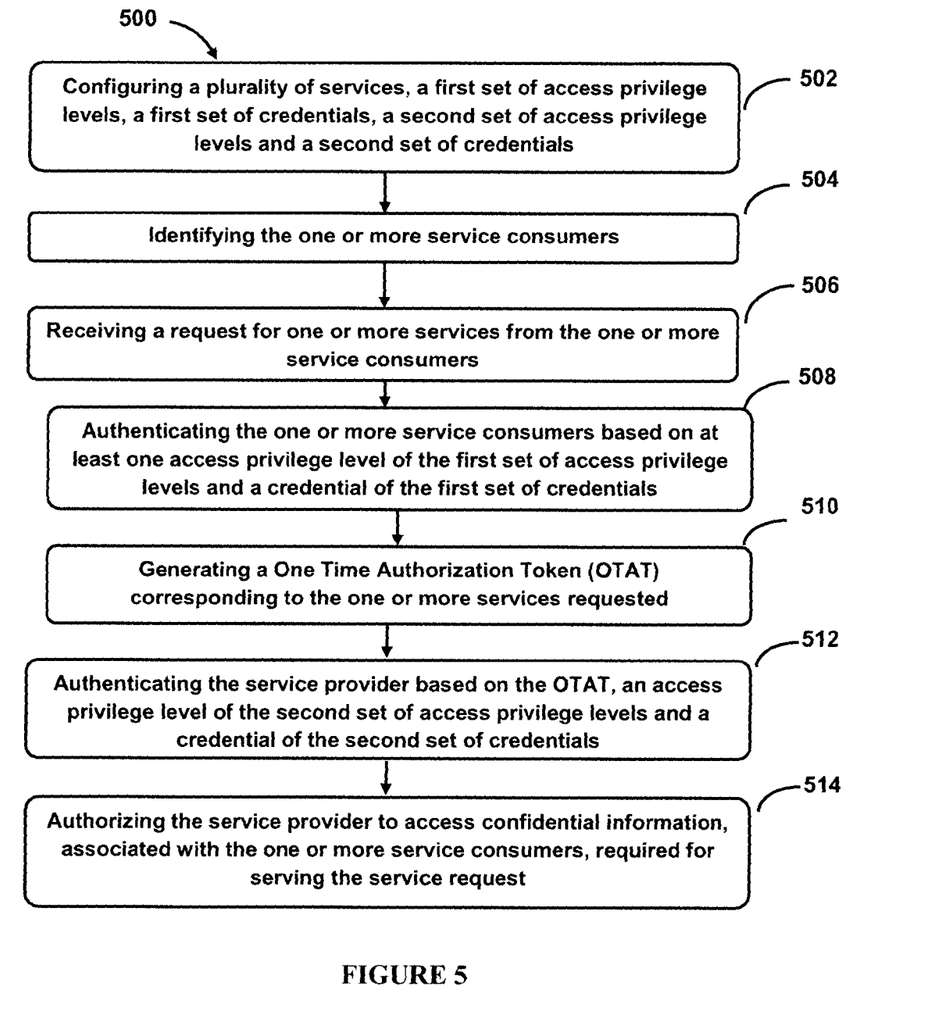
FIG. 5 illustrates a method for enabling multi-party and multi-level authorizations for accessing confidential information, in accordance with an embodiment of the present disclosure.

Referring now to FIG. 5, a method 500 for enabling multi-party and multi-level authorizations for accessing confidential information is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method can be implemented in any suitable hardware, software, firmware, or combination thereof. However, for ease of explanation, in the embodiments described below, the method 500 may be considered to be implemented in the above described system 102.

At block 502, a plurality of services, a first set of access privilege levels, a first set of credentials corresponding to the first set of access privilege levels, a second set of access privilege levels and a second set of credentials corresponding to the second set of access privilege levels may be configured by using the service configuration module 212. The first set of access privilege levels and the second set of privilege levels are associated with the plurality of services, and wherein at least one access privilege level of the first set of access privilege levels and at least one credential of the first set of credentials are provided to one or more service consumers for requesting one or more services of the plurality of services, and wherein at least one access privilege level of the second set of access privilege levels and at least one credential of the second set of credentials are provided to a service provider to serve the one or more services requested by the one or more service consumers.

At block 504, the one or more service consumers may be identified based upon a unique identifier associated with the one or more service consumers. The service consumer may be enabled to access the system 102 through the interface 204_1 after the identification.

At block 506, upon successful identification, a service request from the one more service consumers may be received through the User Interaction module 214. The service request may be received for facilitating one or more services of the plurality of services At block 508, the one or more service consumers may be authenticated based upon an access privilege level of the first set of access privilege levels and a credential, of the first set of credentials, corresponding to the access privilege level of the first set of access privilege levels.

At block 510, a One Time Authorization Token (OTAT) corresponding to the one or more services may be generated.

At block 512, the service provider may be authenticated based upon the OTAT an access privilege level of the second set of access privilege levels, and a credential, of the second set of credentials, corresponding to the access privilege level of the second set of access privilege levels.

At block 514, upon successful authentication at block 512, the system 102 may facilitate access to the service provider. Specifically, the service provider may be authorized to access confidential information, associated with the one or more service consumers, required for serving the service request. The service provider may then access the data associated with the service consumer to render the service requested by the service consumer. Furthermore, few data fields may be masked to restrict the access of the data by the service provider. The service provider may access the system 102 through the interface 204_2.

Although implementations for methods and systems for enabling multi-party and multi-level authorizations for accessing confidential information have been described in language specific to structural features and/or methods, it is to be understood that the appended claims are not necessarily limited to the specific features or methods described.

We claim:

1. A method enabling multi-party and multi-level authorizations for accessing confidential information, the method comprising:

configuring, by a processor, a plurality of services, a first set of access privilege levels, a first set of credentials corresponding to the first set of access privilege levels, a second set of access privilege levels and a second set of credentials corresponding to the second set of access privilege levels, wherein the first set of access privilege levels and the second set of privilege levels are associated with the plurality of services, and wherein at least one access privilege level of the first set of access privilege levels and at least one credential of the first set of credentials are provided to one or more service consumers for requesting one or more services of the plurality of services, and wherein at least one access privilege level of the second set of access privilege levels and at least one credential of the second set of credentials are provided to a service provider to serve the one or more services requested by the one or more service consumers;

identifying, by the processor, the one or more service consumers based upon a unique identifier associated with the one or more service consumers;

receiving, by the processor, a service request from the one or more service consumers, after the identification, for facilitating one or more services of the plurality of services;

authenticating, by the processor, the one or more service consumers based upon an access privilege level, of the first set of access privilege levels, configured for the service and a credential, of the first set of credentials, corresponding to the access privilege level of the first set of access privilege levels;

generating, by the processor, a One Time Authorization Token (OTAT) corresponding to the one or more services requested by the one more service consumers after the authorization of the one or more service consumers;

authenticating, by the processor, the service provider based on the OTAT, an access privilege level of the second set of access privilege levels and a credential, of the second set of credentials, corresponding to the access privilege level of the second set of access privilege levels; and authorizing, by the processor, the service provider to access confidential information, associated with the one or more service consumers, required for serving the service request from the one or more service consumers, wherein the access is provided to the service provider until the service request is served or a validity time associated with the OTAT is expired.

2. The method of claim 1, wherein the first set of credentials and the second set of credentials comprises at least one of a credential, a biometric signature, a secret question and a combination thereof, and wherein the biometric signature comprises at one of a fingerprint, iris, face, palm-vein, voice and a combination thereof, and wherein the first set of access privilege levels and the second set of access privilege levels are configured based on each service and a level of confidentiality associated with the confidential information.

3. The method of claim 1, wherein the unique identifier is one of a credential like username and password, Radio-frequency identification (RFID), a personal identification number (PIN), a credential used to access a social media platform, an internet id, an account number, a onetime password (OTP) and a combination thereof.

4. The method of claim 1, wherein service request is received from a service consumer device associated with the one or more service consumers, and wherein the service consumer device is one of a mobile phone, a kiosk, an interactive voice response (IVR) enabled device, internet enabled device, POS Terminal and a computing terminal present within the premises of the service provider, wherein the device is pre-registered to issue the service request.

5. The method of claim 4, further comprising displaying, on the service consumer device, a service catalogue comprising one or more services, from the plurality of services applicable for the one or more service consumers, and wherein the service catalogue is displayed after the identification of the one or more service consumers.

6. The method of claim 1, wherein the OTAT further comprises token details associated with the OTAT, wherein the token details comprises a token type, Unique ID for Token, Host Identifier, role and access privilege level of the service provider for whom the token is issued, identifier of the one or more service consumers issuing the token, consumer ID, list of one or more accounts along with account identifiers, service endpoint reference, list of services for the one or more accounts, access privilege level for each service, data sensitivity instructions, token issue timestamp, and token expiry timestamp.

7. The method of claim 6, further comprising generating a unique key based upon the authentication of the one or more consumers, wherein the unique key is generated when the service request is received from one of the mobile phone, the kiosk, the interactive voice response (IVR) enabled device, or the internet enabled device, and wherein the unique key is one of an alphanumeric key, a numeric key, or a hash code or a combination thereof, and wherein the generation of the unique key is further notified to the one or more service consumers by transmitting a text message or a multimedia message on the service consumer device to the registered notification means.

8. The method of claim 7, wherein the key comprises an authorization details, service details, information of the one or more service consumers, the validity time and a wait time, and wherein the key is further translated into the OTAT.

9. The method of claim 4, wherein the service provider is authorized to access the confidential information via a service provider device, and wherein the service provider device is a computing terminal present within the premises of the service provider, and wherein the service provider device is further pre-registered to serve the service request from the one or more service consumers.

10. The method of claim 9, wherein the confidential information is classified into at least one of predefined categories based upon the level of confidentiality associated with the confidential information, and wherein the confidential information is displayed, on the service provider device, based upon the classification of the confidential information into a predefined category.

11. The method of claim 10, wherein the predefined category comprises highly secret, secret, confidential and restrictive, and wherein the confidential information is masked or partially masked based upon the classification.

12. The method of claim 5, wherein the service request is received in order to facilitate one or more services of the plurality of services, and wherein the one or more service consumers are authenticated based upon a highest access privilege level amongst the access privilege levels configured for the multiple services and a credential corresponding to the highest access privilege level.

13. The method of claim 1, further comprising authorizing the service provider to serve another service request, associated with one or more additional service, received from the one or more service consumers within the validity time associated with the OTAT, and wherein the another service request is served by authenticating the service provider based on the OTAT, an access privilege level, of the second set of access privilege levels, configured for enabling display of the service catalogue to the one or more consumers and a credential corresponding to the said access privilege level configured for enabling the display of the service catalogue, displaying, based upon the authentication, the service catalogue on the service consumer device, receiving another service request for facilitating the one or more additional service present in the service catalogue, authenticating the one or more service consumers based on an additional access privilege level of the first set of access privilege levels configured for the one or more additional service and a credential, of the first set of credentials, corresponding to the additional access privilege level of the first set of access privilege levels, updating the token details in the OTAT based upon the one or more additional service in order to generate an updated OTAT and authorizing the service provider to access confidential information based upon the updated OTAT in order to serve another service request associated with one or more additional service.

14. A system for enabling multi-party and multi-level authorizations for accessing confidential information, the system comprising:

a plurality of sensors;

a processor; and a memory coupled to the processor, wherein the processor is capable of executing a plurality of modules stored in the memory, and wherein the plurality of modules comprising:

a service configuration module configured to configure a plurality of services, a first set of access privilege levels, a first set of credentials corresponding to the first set of access privilege levels, a second set of access privilege levels and a second set of credentials corresponding to the second set of access privilege levels, wherein the first set of access privilege levels and the second set of privilege levels are associated with the plurality of services, and wherein at least one access privilege level of the first set of access privilege levels and at least one credential of the first set of credentials are provided to one or more service consumers for requesting one or more services of the plurality of services, and wherein at least one access privilege level of the second set of access privilege levels and at least one credential of the second set of credentials are provided to a service provider to serve the one or more services requested by the one or more service consumers;

a user interaction module configured to identify the one or more service consumers based upon a unique identifier associated with the one or more service consumers;

receive a service request from the one more service consumers, after the identification, for facilitating one or more services of the plurality of services;

authenticate the one or more service consumers based upon an access privilege level, of the first set of access privilege levels, configured for the service and a credential, of the first set of credentials, corresponding to the access privilege level of the first set of access privilege levels;

generate a One Time Authorization Token (OTAT) corresponding to the one or more services requested by the one more service consumers after the authorization of the one or more service consumers;

authenticate the service provider based on the OTAT, an access privilege level of the second set of access privilege levels configured for the service and a credential, of the second set of credentials, corresponding to the access privilege level of the second set of access privilege levels; and authorize the service provider to access confidential information, associated with the one or more service consumers, required for serving the service request from the one or more service consumers, wherein the access is provided to the service provider until the service request is served or a validity time associated with the OTAT is expired.

15. The system of claim 14, wherein the user interface module is further configured to authorize the service provider to serve another service request, associated with one or more additional service, received from the one or more service consumers within the validity time associated with the OTAT, and wherein the another service request is served by authenticating the service provider based on the OTAT, an access privilege level, of the second set of access privilege levels, configured for enabling display of the service catalogue to the one or more consumers and a credential corresponding to the said access privilege level configured for enabling the display of the service catalogue, displaying, based upon the authentication, the service catalogue on the service consumer device, receiving another service request for facilitating the one or more additional service present in the service catalogue, authenticating the one or more service consumers based an additional access privilege level of the first set of access privilege levels configured for the one or more additional service and a credential, of the first set of credentials, corresponding to the additional access privilege level of the first set of access privilege levels, updating the token details in the OTAT based upon the one or more additional service in order to generate an updated OTAT and authorizing the service provider to access confidential information based upon the updated OTAT in order to serve another service request associated with one or more additional service.

16. A non-transitory computer readable medium embodying a program executable in a computing device for enabling multi-party and multi-level authorizations for accessing confidential information, the program comprising:

a program code for configuring a plurality of services, a first set of access privilege levels, a first set of credentials corresponding to the first set of access privilege levels, a second set of access privilege levels and a second set of credentials corresponding to the second set of access privilege levels, wherein the first set of access privilege levels and the second set of privilege levels are associated with the plurality of services, and wherein at least one access privilege level of the first set of access privilege levels and at least one credential of the first set of credentials are provided to one or more service consumers for requesting one or more services of the plurality of services, and wherein at least one access privilege level of the second set of access privilege levels and at least one credential of the second set of credentials are provided to a service provider to serve the one or more services requested by the one or more service consumers;

a program code for identifying the one or more service consumers based upon a unique identifier associated with the one or more service consumers;

a program code for receiving a service request from the one more service consumers, after the identification, for facilitating one or more services of the plurality of services;

a program code for authenticating the one or more service consumers based upon an access privilege level, of the first set of access privilege levels, configured for the service and a credential, of the first set of credentials, corresponding to the access privilege level of the first set of access privilege levels;

a program code for generating a One Time Authorization Token (OTAT) corresponding to the one or more services requested by the one more service consumers after the authorization of the one or more service consumers;

a program code for authenticating the service provider based on the OTAT, an access privilege level of the second set of access privilege levels configured for the service and a credential, of the second set of credentials, corresponding to the access privilege level of the second set of access privilege levels; and a program code for authorizing the service provider to access confidential information, associated with the one or more service consumers, required for serving the service request from the one or more service consumers, wherein the access is provided to the service provider until the service request is served or a validity time associated with the OTAT is expired.

* * * * *